Patented Nov. 20, 1951

2,575,324

UNITED STATES PATENT OFFICE 2,575,324

NICKEL-MAGNESIA-ZIRCONIUM SILICATE CATALYST

James H. Shapleigh, Wilmington, Del., assignor to Hercules Powder Company, Wilmington, Del., a corporation of Delaware No Drawing. Application May 18, 1946,
Serial No. 670,839

3 Claims. (Cl. 252—457)

This invention relates to the catalytic decomposition of hydrocarbons and, more particularly, to a process for reacting hydrocarbons and water vapor in the presence of a catalyst which has a relatively high resistancy to sulfur poisoning.

The commercial preparation of hydrogen by the decomposition of hydrocarbons has assumed great importance in industrial chemical operations, such as the synthesis of ammonia from nitrogen and hydrogen, the hydrogenation of vegetable oils, the hydrogenation of natural resins to give products with improved characteristics, the synthesis of alcohols, and the like.

Heretofore, the decomposition of hydrocarbons for this purpose has been accomplished by contacting a gaseous mixture of steam and hydrocarbon at elevated temperatures, preferably with a nickel catalyst, either alone or in combination with other materials such as magnesia, aluminum oxide, pumice, etc., to act as promoters and/or carriers. Temperatures lower than 700° C. have normally been sought to prevent deterioration of the catalyst by sintering or other change in physical form and to prevent the formation of excessive amounts of carbon monoxide. The use of such catalytic compounds has proven quite satisfactory in the reaction of hydrocarbons substantially free of sulfur and/or sulfur compounds. However, when sulfur is present, it is well known that these catalysts are poisoned and that considerably lower conversion yields would be obtained if the the sulfur were not removed. It has, therefore, been necessary to utilize hydrocarbons substantially free of sulfur or sulfur compounds or else to provide suitable preliminary treatments for removing the sulfur. This is both expensive and time consuming and has prevented the use of many hydrocarbons which were otherwise suitable for the purpose. Consequently, a highly sulfur-resistant catalyst is greatly in demand to provide an economical process for utilizing these sulfur-containing hydrocarbons.

It has been discovered that a process utilizing a catalyst comprising nickel and zirconium silicate with or without magnesia gives a substantial improvement in overcoming the aforementioned disadvantages. This process may be operated continuously so as to bring about a high percentage of conversion of the hydrocarbon constituents and with a reduced sulfur poisoning effect as compared to previous processes utilizing nickel catalysts.

In accordance with this invention, therefore, decomposition of the hydrocarbon is effected by passing a heated mixture of gaseous hydrocarbon and steam in contact with a catalytic material comprising in its preferred form a mixture of nickel, zirconium silicate, and magnesium oxide, or alternatively a mixture of nickel and zirconium silicate. For reasons not fully appreciated, these catalysts have increased resistance to sulfur poisoning.

The nickel-zirconium silicate-magnesia catalyst of this invention may be prepared, according to one method, by melting nickel nitrate hexahydrate in its water of crystallization, admixing therewith the magnesia, and then calcining the resulting mass. The calcined mass is admixed with an amount of zirconium silicate to give the desired composition and then pelleted. According to an alternative method, the magnesia and zirconium silicate are mixed, heated and then added to the melted nickel nitrate hexahydrate. This mixture is then calcined, broken up, screened and pelleted as before. The nickel-zirconium silicate catalyst may be prepared by stirring the zirconium silicate into a water solution of the nickel nitrate hexahydrate, drying the mixture, calcining and pelleting.

The pelleted catalyst prepared in accordance with one of the above methods is placed in a suitably heated cracking tube through which a mixture of steam and hydrocarbon is passed according to conventional methods.

Having described the invention generally, the following examples are given to illustrate specific embodiments thereof:

Example 1

Three hundred parts by weight of $Ni(NO_3)_2.6H_2O$ was placed in a mixing vessel and heated to 175° F. Eighty parts by weight of magnesia was added while the melt was rapidly agitated by an air driven mixer. The creamy mixture was poured into drying pans and placed in a steam heated dryer for 18 to 20 hours at a temperature of about 240° F. The dried cake was broken up and run through a calciner at 1500–1800° F.

The calcined powder was mixed with zirconium silicate and additional magnesia in amounts to give a final mixture containing 25% nickel, 25% zirconium silicate, and 50% magnesia. After mixing the dry powders, 30 pounds of water for each 100 pounds of powder were added, the whole well mixed and transferred to a drier where it was dried for about 18 hours.

The dried cake was coarse ground (the largest particles passing a ¼-inch mesh screen), placed in a mixer, and 7 pounds of water per 100 pounds of powder sprinkled on the powder while the mixer was in operation. Mixing was continued for about 7 minutes after the addition of the water. The grained mass was screened through a ¼-inch mesh screen and then compressed into the form of pellets. The finished pellets were placed in a cold calciner or a cold furnace tube and the temperature slowly brought up to a minimum of 1100° F. They were then cooled and were ready for use.

The pellets were placed in the reaction tube of a cracking furnace and a mixture of steam and propane in a volume ratio of 2:1, expressed as volume of steam to carbon in the gas, passed over the pellets at a space velocity of 500 volumes of steam-propane mixture per volume of catalyst per hour and a tube wall temperature of 800° C. (1472° F.). The unpoisoned catalyst gave 97% conversion of the carbon in the propane.

Sulfur as $H_2S$ was then added to the propane at the rate of 100 grains of sulfur per 100 cubic feet of propane feed. After 7 hours of contact with $H_2S$ the percentage conversion had leveled off at 90%.

Under similar conditions, a nickel-magnesia catalyst containing 25% nickel and 75% magnesia dropped from an initial conversion rate of 98% to a subsequent conversion rate of 85% within 4 hours after sulfur was first introduced in the form of $H_2S$ and was still decreasing.

*Example 2*

A nickel-zirconium silicate catalyst (10% nickel-90% zirconium silicate) in accordance with this invention may be made by stirring 540 grams of $ZrSiO_4$ into a solution of 298 grams $Ni(NO_3)_2.6H_2O$ in 100 grams of water, drying the mixture, calcining to decompose the nitrate and pelleting. When utilized in the decomposition of propane, this catalyst gave results comparable to those in Example 1.

The preferred catalyst in accordance with this invention will comprise nickel and zirconium silicate, with or without, but preferably with, magnesia. When magnesia is incorporated, the preferred composition is from about 10% to about 50% nickel, from about 20% to about 80% zirconium silicate, and from about 10% to about 30% magnesia, by weight based on the final material. When magnesia is omitted, the composition will desirably comprise from about 10% to about 50% nickel and from about 50% to about 90% zirconium silicate by weight based on the final material. However, these percentages are not critical. It has been found, for example, that some improvement in sulfur-resistant properties is obtained when the catalyst contains as little as about 5% nickel.

The improved catalyst of this invention may be utilized in any of the known systems for decomposing hydrocarbons to form hydrogen and oxides of carbon. Normally this will consist of a plurality of externally heated tubes into which the catalyst is charged and through which a heated gaseous mixture of steam and hydrocarbon is passed.

The conversion of the hydrocarbons to hydrogen and oxides of carbon over the catalyst is conducted at conventional temperatures, space velocities, and steam-gas ratios, for example, temperatures from about 700 to 800° C.; space velocities in the order of 500 volumes per hour per volume of catalyst; and steam-gas ratios from 2:1 to 4:1 expressed as volume of steam to carbon in the hydrocarbon.

An important advantage of this invention resides in the fact that a catalyst comprising nickel in combination with zirconium silicate, with or without magnesia, possesses increased resistance to sulfur poisoning. Thus, in accordance with this invention, it is possible to obtain improved results in treating sulfur-containing hydrocarbons which are normally gaseous and those which are normally liquid, such as the higher petroleum hydrocarbons.

A further advantage of this invention resides in the fact that the catalyst has a high resistance to sintering or other physical change caused by exposure to high temperatures. Thus, the utilization of high temperatures is possible without substantially effecting the activity of the catalyst.

The word "conversion" as used herein is meant to designate the percentage of carbon in the hydrocarbons which is converted into oxides of carbon during the treatment.

What I claim and desire to protect by Letters Patent is:

1. A catalyst for promoting the reaction between a hydrocarbon and steam comprising zirconium silicate, magnesia and between about 5% and about 50% of nickel.

2. A catalyst for promoting the reaction between a hydrocarbon and steam comprising from about 10% to about 50% nickel, from about 10% to about 30% magnesia, and from about 20% to about 80% zirconium silicate.

3. A catalyst for promoting the reaction between a hydrocarbon and steam comprising about 25% nickel, about 15% magnesia, and about 60% zirconium silicate.

JAMES H. SHAPLEIGH.

REFERENCES CITED

The following references are of record in the file of this patent:

UNITED STATES PATENTS

| Number | Name | Date |
|---|---|---|
| 1,256,032 | Mittasch et al. | Feb. 12, 1918 |
| 1,711,036 | Beekley | Apr. 30, 1929 |
| 1,931,492 | Hennicke | Oct. 24, 1933 |
| 2,064,867 | Woodhouse | Dec. 22, 1936 |
| 2,267,767 | Thomas | Dec. 30, 1941 |
| 2,272,301 | Kinneberg et al. | Feb. 10, 1942 |
| 2,382,239 | Lee | Aug. 14, 1945 |
| 2,417,164 | Huber | Mar. 11, 1947 |
| 2,460,508 | Johnson et al. | Feb. 1, 1949 |
| 2,489,334 | Shabaker | Nov. 29, 1949 |

FOREIGN PATENTS

| Number | Country | Date |
|---|---|---|
| 317,391 | Great Britain | June 16, 1930 |